（12) United States Patent
Jeng et al.

(10) Patent No.: US 11,165,539 B1
(45) Date of Patent: Nov. 2, 2021

(54) METHOD AND APPARATUS FOR DETECTING WORD BOUNDARY BETWEEN CODEWORDS IN DATA STREAM TRANSMITTED VIA DATA CHANNEL OF HIGH DEFINITION MULTIMEDIA INTERFACE

(71) Applicant: MEDIATEK INC., Hsin-Chu (TW)

(72) Inventors: You-Tsai Jeng, Hsinchu (TW); Szu-Hsiang Lai, Hsinchu (TW); Tai-Lai Tung, Hsinchu (TW); Keng-Lon Lei, Hsinchu (TW); Kai-Wen Cheng, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/849,967

(22) Filed: Apr. 15, 2020

(51) Int. Cl.
*H04L 1/00* (2006.01)

(52) U.S. Cl.
CPC .......... *H04L 1/0091* (2013.01); *H04L 1/0079* (2013.01); *H04L 1/0083* (2013.01)

(58) Field of Classification Search
CPC ... H04L 7/042; H04L 7/00887; H04L 1/0091; H04N 21/43635; G09G 2370/12
See application file for complete search history.

(56) References Cited

U.S. PATENT DOCUMENTS

| | | | |
|---|---|---|---|
| 2003/0169831 A1* | 9/2003 | Neugebauer | H03K 9/00 375/316 |
| 2005/0135529 A1* | 6/2005 | Upton | H04L 7/042 375/367 |
| 2015/0036756 A1* | 2/2015 | Choi | H04L 9/0662 375/240.28 |
| 2019/0044695 A1* | 2/2019 | Oh | H04L 7/042 |
| 2019/0280850 A1* | 9/2019 | Tan | H04L 7/04 |
| 2020/0313844 A1* | 10/2020 | Arslan | H04B 1/1027 |
| 2020/0409701 A1* | 12/2020 | Chen | H04L 49/201 |

* cited by examiner

*Primary Examiner* — Aristocratis Fotakis
(74) *Attorney, Agent, or Firm* — Winston Hsu

(57) ABSTRACT

A word boundary detection method includes receiving a data stream from a data channel of a high definition multimedia interface (HDMI), and performing pattern matching upon the data stream to identify a word boundary between two consecutive codewords transmitted via the data stream. Known codewords of scrambled control vectors are involved in the pattern matching.

16 Claims, 8 Drawing Sheets

| SCV | 10-bit codeword [9:0] | SCV | 10-bit codeword [9:0] |
|---|---|---|---|
| 0 | 0000010111 | 1 | 1111101000 |
| 2 | 0000011011 | 3 | 1111100100 |
| 4 | 0000011101 | 5 | 1111100010 |
| 6 | 0000011110 | 7 | 1111100001 |
| 8 | 0000100111 | 9 | 1111011000 |
| 10 | 0000110011 | 11 | 1111001100 |
| 12 | 0000111001 | 13 | 1111000110 |
| 14 | 0000111100 | 15 | 1111000011 |
| 16 | 0001000111 | 17 | 1110111000 |
| 18 | 0001100011 | 19 | 1110011100 |
| 20 | 0001110001 | 21 | 1110001110 |
| 22 | 0001111000 | 23 | 1110000111 |
| 24 | 0010000111 | 25 | 1101111000 |
| 26 | 0011000011 | 27 | 1100111100 |
| 28 | 0011100001 | 29 | 1100011110 |
| 30 | 0011110000 | 31 | 1100001111 |

FIG. 2

| IToggle = 0 | | IToggle = 1 | |
|---|---|---|---|
| SCV | 10-bit codeword [9:0] | SCV | 10-bit codeword [9:0] |
| 0 | 00:00010111 | 1 | 11:11101000 |
| 2 | 00:00011011 | 3 | 11:11100100 |
| 4 | 00:00011101 | 5 | 11:11100010 |
| 6 | 00:00011110 | 7 | 11:11100001 |
| 8 | 00:00100111 | 9 | 11:11011000 |
| 10 | 00:00110011 | 11 | 11:11001100 |
| 12 | 00:00111001 | 13 | 11:11000110 |
| 14 | 00:00111100 | 15 | 11:11000011 |
| 16 | 00:01000111 | 17 | 11:10111000 |
| 18 | 00:01100011 | 19 | 11:10011100 |
| 20 | 00:01110001 | 21 | 11:10001110 |
| 22 | 00:01111000 | 23 | 11:10000111 |
| 24 | 00:10000111 | 25 | 11:01111000 |
| 26 | 00:11000011 | 27 | 11:00111100 |
| 28 | 00:11100001 | 29 | 11:00011110 |
| 30 | 00:11110000 | 31 | 11:00001111 |

FIG. 5

| SCV | Number of 1's = 4<br>10-bit codeword<br>[9:0] | SCV | Number of 1's = 6<br>10-bit codeword<br>[9:0] |
|---|---|---|---|
| 0  | 0000010111 | 1  | 1111101000 |
| 2  | 0000011011 | 3  | 1111100100 |
| 4  | 0000011101 | 5  | 1111100010 |
| 6  | 0000011110 | 7  | 1111100001 |
| 8  | 0000100111 | 9  | 1111011000 |
| 10 | 0000110011 | 11 | 1111001100 |
| 12 | 0000111001 | 13 | 1111000110 |
| 14 | 0000111100 | 15 | 1111000011 |
| 16 | 0001000111 | 17 | 1110111000 |
| 18 | 0001100011 | 19 | 1110011100 |
| 20 | 0001110001 | 21 | 1110001110 |
| 22 | 0001111000 | 23 | 1110000111 |
| 24 | 0010000111 | 25 | 1101111000 |
| 26 | 0011000011 | 27 | 1100111100 |
| 28 | 0011100001 | 29 | 1100011110 |
| 30 | 0011110000 | 31 | 1100001111 |

FIG. 6

| 0/1 transition | SCV | 10-bit codeword [9:0] | SCV | 10-bit codeword [9:0] |
|---|---|---|---|---|
| 3 | 0 | 0000010111 | 1 | 1111101000 |
| 3 | 2 | 0000011011 | 3 | 1111100100 |
| 3 | 4 | 0000011101 | 5 | 1111100010 |
| 2 | 6 | 0000011110 | 7 | 1111100001 |
| 3 | 8 | 0000100111 | 9 | 1111011000 |
| 3 | 10 | 0000110011 | 11 | 1111001100 |
| 3 | 12 | 0000111001 | 13 | 1111000110 |
| 2 | 14 | 0000111100 | 15 | 1111000011 |
| 3 | 16 | 0001000111 | 17 | 1110111000 |
| 3 | 18 | 0001100011 | 19 | 1110011100 |
| 3 | 20 | 0001110001 | 21 | 1110001110 |
| 2 | 22 | 0001111000 | 23 | 1110000111 |
| 3 | 24 | 0010000111 | 25 | 1101111000 |
| 3 | 26 | 0011000011 | 27 | 1100111100 |
| 3 | 28 | 0011100001 | 29 | 1100011110 |
| 2 | 30 | 0011110000 | 31 | 1100001111 |

FIG. 7

| IToggle = 0 | | IToggle = 1 | |
|---|---|---|---|
| SCV | 10-bit codeword [9:0] | SCV | 10-bit codeword [9:0] |
| 0 | 0:0000101111 | 1 | 1:1111010000 |
| 2 | 0:0000011011 | 3 | 1:1111100100 |
| 4 | 0:0000011101 | 5 | 1:1111000010 |
| 6 | 0:0000011110 | 7 | 1:1111000001 |
| 8 | 0:0001000111 | 9 | 1:1110011000 |
| 10 | 0:0001100011 | 11 | 1:1110001100 |
| 12 | 0:0001111001 | 13 | 1:1110000110 |
| 14 | 0:0001111100 | 15 | 1:1110000011 |
| 16 | 0:0010000111 | 17 | 1:1101111000 |
| 18 | 0:0011000011 | 19 | 1:1100111100 |
| 20 | 0:0011110001 | 21 | 1:1100001110 |
| 22 | 0:0011111000 | 23 | 1:1100000111 |
| 24 | 0:0100000111 | 25 | 1:1101111000 |
| 26 | 0:0110000011 | 27 | 1:1100111100 |
| 28 | 0:0111000001 | 29 | 1:1100011110 |
| 30 | 0:0111100000 | 31 | 1:1100001111 |

METHOD AND APPARATUS FOR DETECTING WORD BOUNDARY BETWEEN CODEWORDS IN DATA STREAM TRANSMITTED VIA DATA CHANNEL OF HIGH DEFINITION MULTIMEDIA INTERFACE

BACKGROUND

The present invention relates to word boundary detection, and more particularly, to a method and apparatus for detecting a word boundary between codewords in a data stream transmitted via a data channel of a high definition multimedia interface (HDMI).

Different types of multimedia data are often transmitted from a source device to a sink device over an interface, such as a high definition multimedia interface (HDMI) that uses differential signaling. The information transmitted across the HDMI is often repetitive in nature, which causes unwanted interference. To address the interference, video data can be encoded with transition minimized differential signaling (TMDS) to minimize transitions. However, as HDMI bandwidths increase and wireless services expand, further interference reduction is necessary. For example, in accordance with the HDMI 2.0 specification, scrambling techniques may be employed for reducing electromagnetic interference (EMI) and radio frequency interference (RFI) in 3 data channels: TMDS Channels 0, 1, and 2. For example, control data may be scrambled and encoded for transmission during control periods. In general, HDMI utilizes TMDS to send 10-bit codewords that are transition minimized encoded. A transmitter of an HDMI source device transmits 10-bit codewords in a bit-by-bit manner, and a receiver of an HDMI sink device receives 10-bit codewords in a bit-by-bit manner. The receiver of the HDMI sink device is required to find a correct word boundary of each codeword transmitted in a data stream to make the codeword meaningful. Otherwise, the received signal would become noise.

Thus, there is a need for an innovative word boundary detection scheme that is capable of identifying a word boundary between consecutive codewords transmitted via a data channel of HDMI.

SUMMARY

One of the objectives of the claimed invention is to provide a method and apparatus for detecting a word boundary between codewords in a data stream transmitted via a data channel of a high definition multimedia interface (HDMI).

According to a first aspect of the present invention, an exemplary word boundary detection method is disclosed. The exemplary word boundary detection method includes: receiving a data stream from a data channel of a high definition multimedia interface (HDMI), and performing pattern matching upon the data stream to identify a word boundary between two consecutive codewords transmitted via the data stream, wherein known codewords of scrambled control vectors are involved in said pattern matching.

According to a second aspect of the present invention, an exemplary word boundary detection apparatus is disclosed. The exemplary word boundary detection apparatus includes a receiving circuit and a word boundary identifying circuit. The receiving circuit is arranged to receive a data stream from a data channel of a high definition multimedia interface (HDMI). The word boundary identifying circuit is arranged to perform pattern matching upon the data stream to identify a word boundary between two consecutive codewords transmitted via the data stream, wherein known codewords of scrambled control vectors are involved in said pattern matching performed by the word boundary identifying circuit.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a table of 10-bit codewords for scrambled control periods.

FIG. 5 is a diagram illustrating a first inherent characteristic possessed by codewords of scrambled control vectors.

FIG. 6 is a diagram illustrating a second inherent characteristic possessed by codewords of scrambled control vectors.

FIG. 7 is a diagram illustrating a third inherent characteristic possessed by codewords of scrambled control vectors.

FIG. 8 is a diagram illustrating a fourth inherent characteristic possessed by codewords of scrambled control vectors.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
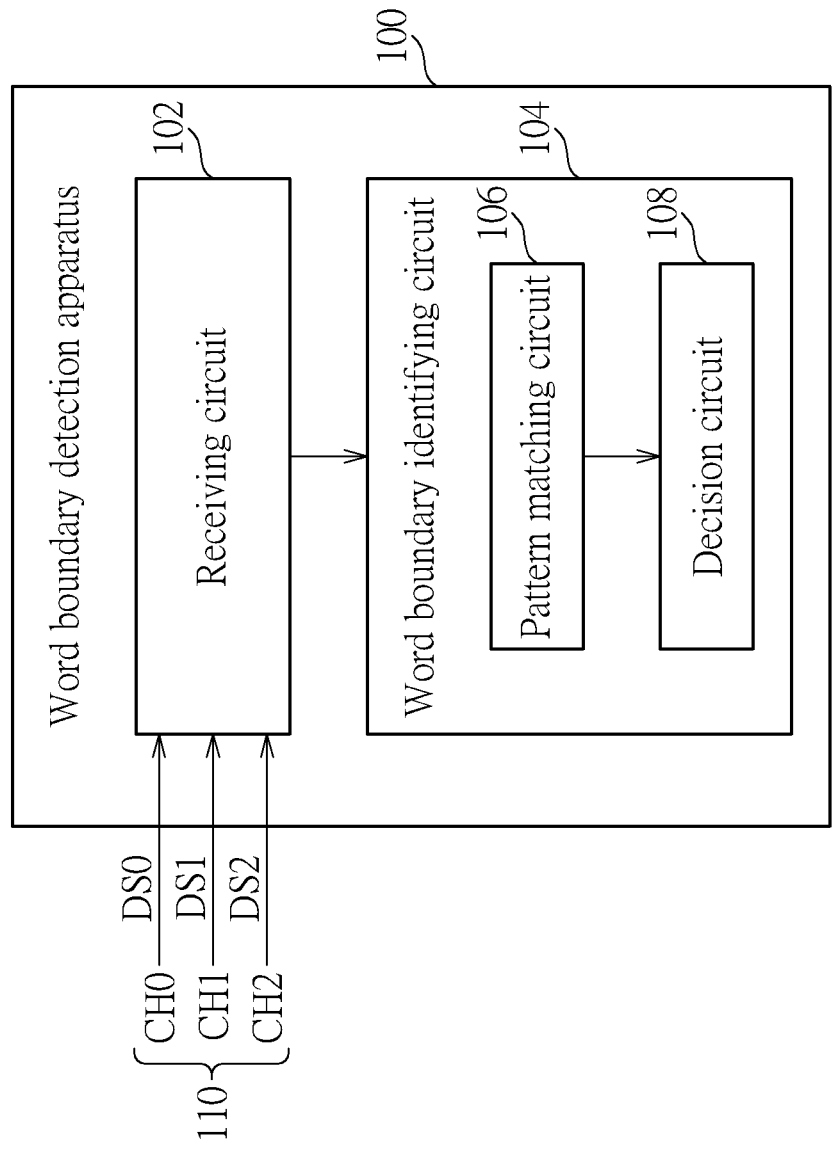
FIG. 1 is a diagram illustrating a word boundary detection apparatus according to an embodiment of the present invention.

FIG. 1 is a diagram illustrating a word boundary detection apparatus according to an embodiment of the present invention. The word boundary detection apparatus 100 is a part of an HDMI sink device, and includes a receiving circuit 102 and a word boundary identifying circuit 104. The word boundary identifying circuit 104 includes a pattern matching circuit 106 and a decision circuit 108. For example, the HDMI sink device complies with an HDMI 2.0 specification. The receiving circuit 102 is arranged to receive data streams DS0, DS1, and DS2 that are transmitted from an HDMI source device (not shown) via data channels CH0, CH1, and CH2 of HDMI 110, where the data stream DS0 is transmitted via data channel CH0, the data stream DS1 is transmitted via data channel CH1, and the data stream DS2 is transmitted via data channel CH2. The word boundary identifying circuit 104 is arranged to perform pattern matching upon a data stream DS0/DS1/DS2 to identify a word boundary between two consecutive codewords transmitted via the data stream DS0/DS1/DS2, wherein known codewords of scrambled control vectors (SCVs) are involved in the pattern matching.

The HDMI utilizes TMDS to transmit video data and utilizes TMDS Error Reduction Coding (TERC4) to transmit audio and auxiliary data over data channels via one of operating modes. The operating modes include a video data period in which the pixels of an active video line are transmitted, a data island period in which audio and auxiliary data are transmitted, a scrambled control period in which scrambled control codes are transmitted, and a scrambler synchronization control period (SSCP) in which scrambled control codes and unscrambled control codes are transmitted. In accordance with HDMI 2.0 specification, a 5-bit scrambled control vector (SCV) consists of an IToggle bit and a 4-bit scrambled control code. One 5-bit SCV is encoded into one 10-bit codeword that is transmitted during a control period (e.g., scrambled control period). FIG. 2 is a table of 10-bit codewords for scrambled control periods. As shown in FIG. 2, 10-bit codewords of SCVs have known patterns. Based on such an observation, the present invention proposes using known patterns (e.g., 10-bit codewords of 5-bit SCVs) for word boundary identification.

Figure 3:
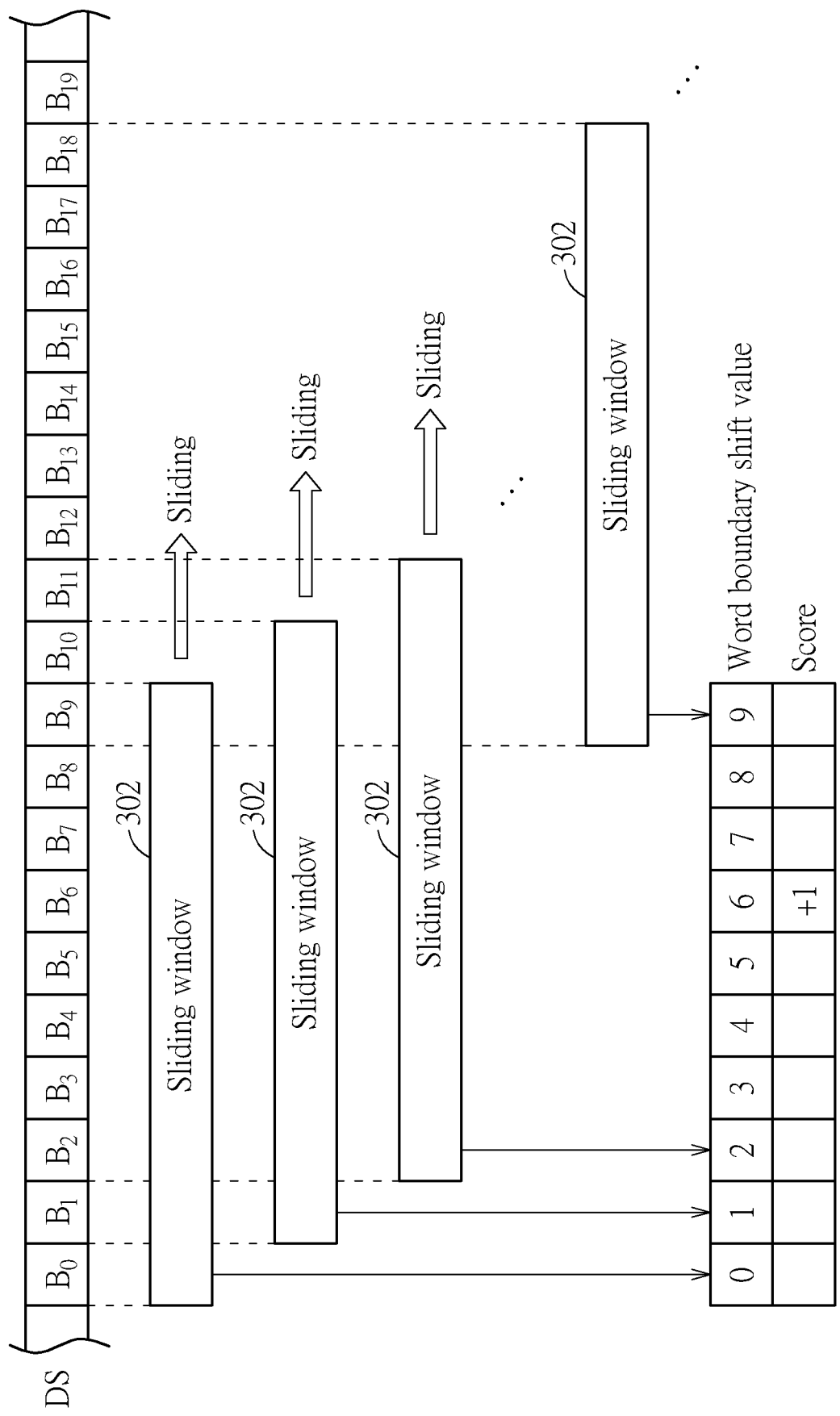
FIG. 3 is a diagram illustrating one pattern matching process according to an embodiment of the present invention.

Please refer to FIG. 3 in conjunction with FIG. 1. FIG. 3 is a diagram illustrating one pattern matching process according to an embodiment of the present invention. The pattern matching circuit 106 is arranged to employ a sliding window with a size that is an integer multiple of a size of one codeword. In this example, 10-bit codewords are transmitted via a data stream DS (DS=DS0, DS1, or DS2), and a size of a sliding window 302 is set by 10. The pattern matching circuit 106 is arranged to move a start point of the sliding window 302 to each of a plurality of consecutive bits transmitted via the data stream DS, and is further arranged to check if a bitstream segment of the data stream DS that is currently selected by the sliding window 302 matches one of known patterns (10-bit codewords) of 5-bit SCVs to generate one checking result when the start point of the sliding window 302 is at one of the consecutive bits. Hence, checking results are obtained by the sliding window 302 for consecutive bits, respectively. As shown in FIG. 3, when the start point of the sliding window 302 is initially at bit $B_0$ of the data stream DS, a bitstream segment consisting of consecutive bits $B_0$-$B_9$ is selected for pattern matching. For example, the pattern matching circuit 106 compares the bitstream segment $B_0$-$B_9$ with the known codewords (10-bit codewords of 5-bit SCVs) to determine if the bitstream segment $B_0$-$B_9$ matches one of the known codewords, and generates a checking result. The decision circuit 108 refers to the checking result for determining whether to update a score recorded for a word boundary shift value. Since the size of one codeword is 10, the word boundary shift values include 0, 1, 2, 3, 4, 5, 6, 7, 8, and 9. At the beginning of pattern matching, the decision circuit 108 may assign initial values (e.g., 0's) to scores of respective word boundary shift values. When the checking result indicates that the bitstream segment $B_0$-$B_9$ matches one of the known codewords, the decision circuit 108 updates a score recorded for the word boundary shift value 0. For example, an increment value +1 is added to the score recorded for the word boundary shift value 0. When the checking result indicates that the bitstream segment $B_0$-$B_9$ does not match any of the known codewords, the decision circuit 108 keeps the score recorded for the word boundary shift value 0 unchanged.

Next, the pattern matching circuit 106 moves the start point of the sliding window 302 to the next bit (i.e., bit $B_1$) in the data stream DS, and a bitstream segment consisting of consecutive bits $B_1$-$B_{10}$ is selected for pattern matching. For example, the pattern matching circuit 106 compares the bitstream segment $B_1$-$B_{10}$ with the known codewords (10-bit codewords of 5-bit SCVs) to determine if the bitstream segment $B_1$-$B_{10}$ matches one of the known codewords, and generates a checking result. The decision circuit 108 refers to the checking result for determining whether to update a score recorded for the word boundary shift value 1. When the checking result indicates that the bitstream segment $B_1$-$B_{10}$ matches one of the known codewords, the decision circuit 108 updates a score recorded for the word boundary shift value 1. For example, an increment value +1 is added to the score recorded for the word boundary shift value 1. When the checking result indicates that the bitstream segment $B_1$-$B_{10}$ does not match any of the known codewords, the decision circuit 108 keeps the score recorded for the word boundary shift value 1 unchanged.

The pattern matching circuit 106 shifts the sliding window 302 for subsequent pattern matching. Hence, one checking result is obtained when the start point of the sliding window 302 is shifted to bit $B_2$, one checking result is obtained when the start point of the sliding window 302 is shifted to bit $B_3$, and so on. As shown in FIG. 3, when the start point of the sliding window 302 is shifted to bit $B_9$, a bitstream segment consisting of consecutive bits $B_9$-$B_{18}$ is selected for pattern matching. For example, the pattern matching circuit 106 compares the bitstream segment $B_9$-$B_{18}$ with the known patterns (10-bit codewords of 5-bit SCVs) to determine if the bitstream segment $B_9$-$B_{18}$ matches one of the known codewords, and generates a checking result. The decision circuit 108 refers to the checking result for determining whether to update a score recorded for the word boundary shift value 9. When the checking result indicates that the bitstream segment $B_9$-$B_{18}$ matches one of the known codewords, the decision circuit 108 updates the score recorded for the word boundary shift value 9. For example, an increment value +1 is added to the score recorded for the word boundary shift value 9. When the checking result indicates that the bitstream segment $B_9$-$B_{18}$ does not match any of the known codewords, the decision circuit 108 keeps the score recorded for the word boundary shift value 9 unchanged.

After checking results are obtained by shifting the start point of the sliding window 302 to consecutive bits $B_0$-$B_9$, one pattern matching test is done. In this example shown in FIG. 3, one checking result obtained under a condition that the start point of the sliding window 302 is at bit $B_6$ indicates that a bitstream segment selected by the sliding window 302 matches one of the known codewords, and an increment value +1 is added to the score recorded for the word boundary shift value 6.

To improve accuracy of word boundary detection, the pattern matching circuit 106 that uses the sliding window 302 may perform the pattern matching test more than once. For example, the pattern matching circuit 106 may perform the pattern matching test for M times, where M is a positive integer and M>1. Hence, the start point of the sliding window 302 is sequentially shifted to consecutive bits $B_0$-$B_{(00*M-1)}$, where a first pattern matching test is done by sequentially shifting the start point of the sliding window 302 to consecutive bits $B_0$-$B_9$, a second pattern matching test is done by sequentially shifting the start point of the sliding window 302 to consecutive bits $B_{10}$-$B_{19}$, a third pattern matching test is done by sequentially shifting the start point of the sliding window 302 to consecutive bits $B_{20}$-$B_{29}$, and so on. It should be noted that the value of M can be adjusted, depending upon actual design considerations.

The decision circuit 108 is arranged to refer to checking results obtained by the pattern matching circuit 106 to identify a word boundary between two consecutive codewords that are included in a data stream transmitted via a data channel of HDMI 110. For example, after a checking result is obtained in response to the start point of the sliding window 302 at a last bit $B_{(10*M-1)}$ of consecutive bits $B_0$-$B_{(10*M-1)}$, the decision circuit 108 selects a largest score from scores recorded for respective word boundary shift values 0-9, compares the largest score with a predetermined threshold to generate a comparison result, and identifies the word boundary between two consecutive codewords in the data stream DS according to a word boundary shift value that corresponds to the largest score when the comparison result indicates the largest score reaches (i.e., equals or exceeds) the predetermined threshold.

The setting of the predetermined threshold may depend on the number of times the pattern matching circuit 106 performs the pattern matching test by using the sliding window 302. In a case where the number of times the pattern matching circuit 106 performs the pattern matching test by using the sliding window 302 is equal to M, the predetermined threshold may be set by N, where N is a positive integer and $1<N<M$. Hence, when the largest score obtained after the pattern matching circuit 106 performs the pattern matching test for M times is found equal to or larger than N, the decision circuit 108 refers to a word boundary shift value associated with the largest score to identify the word boundary between consecutive codewords. For example, when the word boundary shift value 6 is associated with the largest score that reaches the predetermined threshold, the decision circuit 108 determines that one 10-bit codeword in the data stream DS starts from bit $B_i$, where i=6+10 k, and k={0, 1, 2, 3, . . . }. It should be noted that the value of N can be adjusted, depending upon actual design considerations.

According to a probability analysis for a case in FIG. 3 where the number of times the pattern matching circuit 106 performs the pattern matching test and the predetermined threshold are properly set, the false alarm probability and the miss detection probability are both low, meaning that the proposed word boundary detection scheme is robust.

With regard to a small picture, the length of the control period may be small. The number of times the pattern matching circuit 106 performs the pattern matching test by using the sliding window 302 and the predetermined threshold may be dynamically adjusted according to the picture resolution. For a small picture case, the number of times the pattern matching circuit 106 performs the pattern matching test by using the sliding window 302 may be set by M', and the predetermined threshold may be set by N', where M' and N' are positive integers, $1<M'<M$, $1<N'<N$, and $N'<M'$. In a case where values of M' and N' are properly set, the probability analysis indicates that the false alarm probability and the miss detection probability are both low, meaning that the proposed word boundary detection scheme is robust. It should be noted that the values of M' and N' can be adjusted, depending upon actual design considerations.

As mentioned above, the pattern matching circuit 106 employs a sliding window with a size that is an integer multiple of a size of one codeword. In above embodiment, 10-bit codewords are transmitted via a data stream, and a size of the sliding window 302 is set by 10. However, this is for illustrative purposes only, and is not meant to be a limitation of the present invention. Alternatively, the integer multiple may be larger than one. For example, the integer multiple is equal to two. In other words, a size of a sliding window is set by 20.

Figure 4:
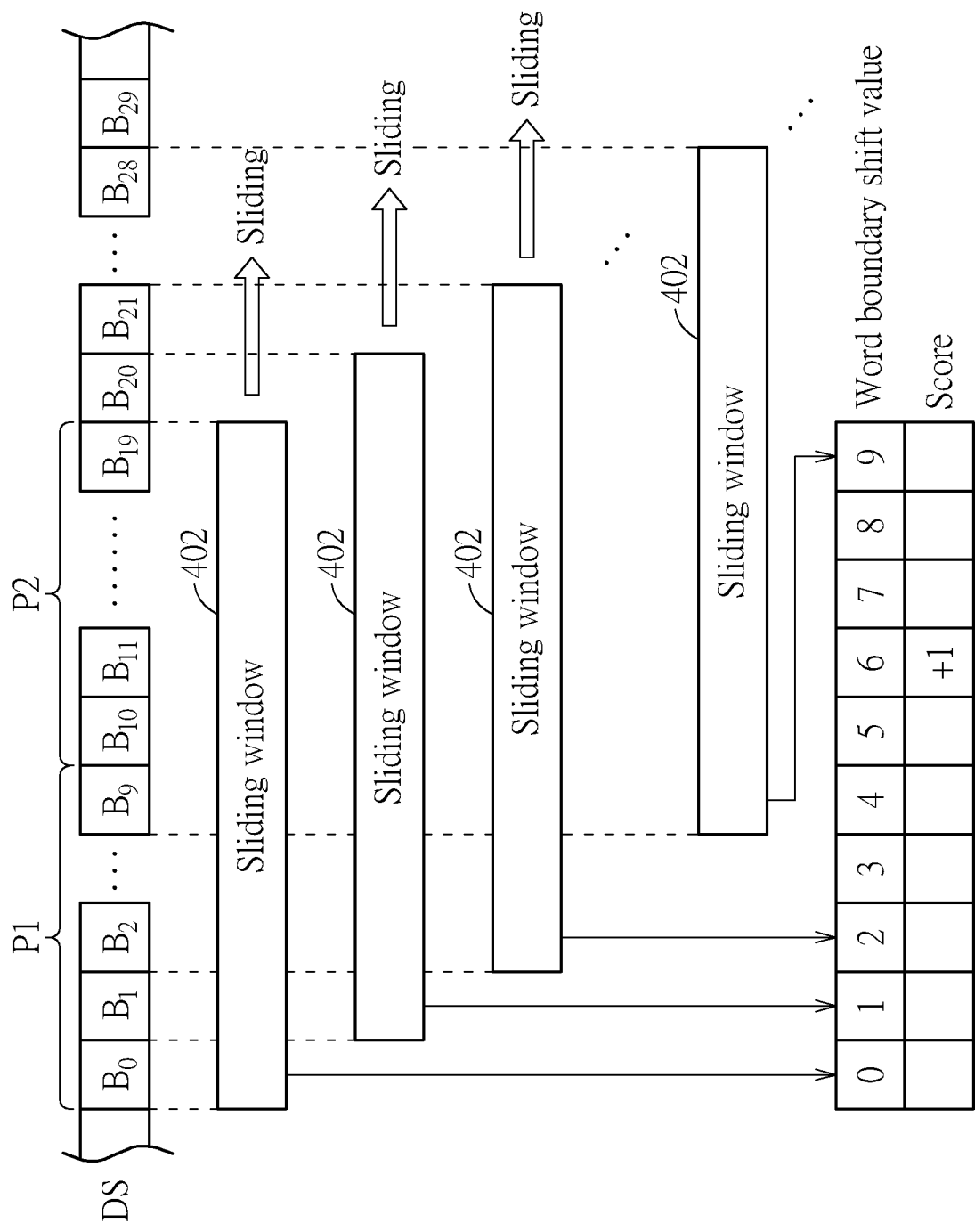
FIG. 4 is a diagram illustrating another pattern matching process according to an embodiment of the present invention.

Please refer to FIG. 4 in conjunction with FIG. 1. FIG. 4 is a diagram illustrating another pattern matching process according to an embodiment of the present invention. In this example, 10-bit codewords are transmitted via the data stream DS (DS=DS0, DS1, or DS2), and a size of a sliding window 402 is set by 20. The pattern matching circuit 106 is arranged to move a start point of the sliding window 402 to each of a plurality of consecutive bits transmitted via the data stream DS, and is further arranged to check if a bitstream segment of the data stream DS that is currently selected by the sliding window 402 matches two of the known codewords (10-bit codewords of 5-bit SCVs) to generate one checking result when the start point of the sliding window 402 is at one of the consecutive bits. Hence, checking results are obtained by the sliding window 402 for the consecutive bits, respectively.

As shown in FIG. 4, when the start point of the sliding window 402 is initially at bit $B_0$ of the data stream DS, a bitstream segment consisting of consecutive bits $B_0$-$B_{19}$ is selected for pattern matching. For example, the pattern matching circuit 106 compares a first 10-bit bitstream portion P1 (which consists of bits $B_0$-$B_9$) with the known codewords to determine if the first 10-bit bitstream portion P1 matches one of the known codewords, compares a second 10-bit bitstream portion P2 (which consists of bits $B_{10}$-$B_{19}$) with the known codewords to determine if the second 10-bit bitstream portion P2 matches one of the known codewords, and generates a checking result. The decision circuit 108 refers to the checking result for determining whether to update a score recorded for a word boundary shift value. Since the size of one codeword is 10, the word boundary shift values include 0, 1, 2, 3, 4, 5, 6, 7, 8, and 9. At the beginning of pattern matching, the decision circuit 108 may assign initial values (e.g., 0's) to scores of respective word boundary shift values. When the checking result indicates that the first 10-bit bitstream portion P1 matches one of the known codewords and the second 10-bit bitstream portion P2 matches one of the known codewords, the decision circuit 108 updates a score recorded for the word boundary shift value 0. For example, an increment value +1 is added to the score recorded for the word boundary shift value 0. When the checking result indicates that one or both of the first 10-bit bitstream portion P1 and the second 10-bit bitstream portion P2 do not match any of the known codewords, the decision circuit 108 keeps the score recorded for the word boundary shift value 0 unchanged.

Next, the pattern matching circuit 106 moves the start point of the sliding window 402 to the next bit (i.e., bit $B_1$) in the data stream DS, and a bitstream segment consisting of consecutive bits $B_1$-$B_{20}$ is selected for pattern matching. For example, the pattern matching circuit 106 compares a first 10-bit bitstream portion (which consists of bits $B_1$-$B_{10}$) with the known codewords to determine if the first 10-bit bitstream portion matches one of the known codewords, compares a second 10-bit bitstream portion (which consists of bits $B_1$-$B_{20}$) with the known codewords to determine if the second 10-bit bitstream portion matches one of the known codewords, and generates a checking result. The decision circuit 108 refers to the checking result for determining whether to update a score recorded for the word boundary shift value 1. When the checking result indicates that the first 10-bit bitstream portion matches one of the known codewords and the second 10-bit bitstream portion matches one of the known codewords, the decision circuit 108 updates a score recorded for the word boundary shift value 1. For example, an increment value +1 is added to the score recorded for the word boundary shift value 1. When the checking result indicates that one or both of the first 10-bit bitstream portion and the second 10-bit bitstream portion do not match any of the known codewords, the decision circuit 108 keeps the score recorded for the word boundary shift value 1 unchanged.

The pattern matching circuit 106 shifts the sliding window 402 for subsequent pattern matching. Hence, one checking result is obtained when the start point of the sliding window 402 is shifted to bit $B_2$, one checking result is obtained when the start point of the sliding window 402 is shifted to bit $B_3$, and so on. As shown in FIG. 4, when the start point of the sliding window 402 is shifted to bit $B_9$, a bitstream segment consisting of consecutive bits $B_9$-$B_{28}$ is selected for pattern matching. For example, the pattern matching circuit 106 compares a first 10-bit bitstream portion of the bitstream segment $B_9$-$B_{28}$ with the known codewords to determine if the first 10-bit bitstream portion matches one of the known codewords, compares a second 10-bit bitstream portion of the bitstream segment $B_9$-$B_{28}$ with the known codewords to determine if the second 10-bit bitstream portion matches one of the known codewords, and generates a checking result. The decision circuit 108 refers to the checking result for determining whether to update a score recorded for the word boundary shift value 9. When the checking result indicates that the first 10-bit bitstream portion matches one of the known codewords and the second 10-bit bitstream portion matches one of the known codewords, the decision circuit 108 updates a score recorded for the word boundary shift value 9. For example, an increment value +1 is added to the score recorded for the word boundary shift value 9. When the checking result indicates that one or both of the first 10-bit bitstream portion and the second 10-bit bitstream portion do not match any of the known codewords, the decision circuit 108 keeps the score recorded for the word boundary shift value 9 unchanged.

After checking results are obtained by shifting the start point of the sliding window 402 to consecutive bits $B_0$-$B_9$, one pattern matching test is done. In this example shown in FIG. 4, one checking result obtained under a condition that the start point of the sliding window 402 is at bit $B_6$ indicates that each of a first 10-bit bitstream portion and a second 10-bit bitstream portion in a bitstream segment selected by the sliding window 402 matches one of the known codewords, and an increment value +1 is added to the score recorded for the word boundary shift value 6.

To improve accuracy of word boundary detection, the pattern matching circuit 106 may perform the pattern matching test more than once. For example, the pattern matching circuit 106 that uses the sliding window 402 may perform the pattern matching test for R times, where R is a positive integer and R>1. For example, R=0.5*M. Hence, the start point of the sliding window 402 is sequentially shifted to consecutive bits $B_0$-$B_{(10*-1)}$, where a first pattern matching test is done by sequentially shifting the start point of the sliding window 402 to consecutive bits $B_0$-$B_9$, a second pattern matching test is done by sequentially shifting the start point of the sliding window 402 to consecutive bits $B_{10}$-$B_{19}$, a third pattern matching test is done by sequentially shifting the start point of the sliding window 402 to consecutive bits $B_{20}$-$B_{29}$, and so on. It should be noted that the value of R can be adjusted, depending upon actual design considerations.

The decision circuit 108 is arranged to refer to checking results obtained by the pattern matching circuit 106 to identify a word boundary between two consecutive codewords that are included in a data stream transmitted via a data channel of HDMI. For example, after a checking result is obtained in response to the start point of the sliding window 402 at a last bit $B_{(10*-1)}$ of consecutive bits $B_0$-$B_{(10*-1)}$, the decision circuit 108 selects a largest score from scores recorded for respective word boundary shift values 0-9, compares the largest score with a predetermined threshold to generate a comparison result, and identifies the word boundary between two consecutive codewords in the data stream DS according to a word boundary shift value that corresponds to the largest score when the comparison result indicates that the largest score reaches (i.e., equals or exceeds) the predetermined threshold.

The setting of the predetermined threshold may depend on the number of times the pattern matching circuit 106 performs the pattern matching test by using the sliding window 402. In a case where the number of times the pattern matching circuit 106 performs the pattern matching test by using the sliding window 402 is equal to R, the predetermined threshold may be set by S, where S is a positive integer and 1<S<R. Hence, when the largest score obtained after the pattern matching circuit 106 performs the pattern matching test for R times is found equal to or larger than S, the decision circuit 108 refers to a word boundary shift value associated with the largest score to identify the word boundary between consecutive codewords. For example, when the word boundary shift value 6 is associated with the largest score that reaches the predetermined threshold, the decision circuit 108 determines that one 10-bit codeword in the data stream DS starts from bit $B_i$, where i=6+10 k, and k={0, 1, 2, 3, . . . }. It should be noted that the value of S can be adjusted, depending upon actual design considerations.

According to a probability analysis for a case in FIG. 4 where the number of times the pattern matching circuit 106 performs the pattern matching test and the predetermined threshold are properly set, the false alarm probability and the miss detection probability are both low, meaning that the proposed word boundary detection scheme is robust.

With regard to a small picture, the length of the control period may be small. The number of times the pattern matching circuit 106 performs the pattern matching test by using the sliding window 402 and the predetermined threshold may be dynamically adjusted according to the picture resolution. For a small picture case, the number of times the pattern matching circuit 106 performs the pattern matching test by using the sliding window 402 may be set by R', and the predetermined threshold may be set by S', where R' and S' are positive integers, 1<R'<R, 1<S'<S, and S'<R'. In a case where values of R' and S' are properly set, the probability analysis indicates that the false alarm probability and the miss detection probability are both low, meaning that the proposed word boundary detection scheme is robust.

The pattern matching circuit 106 checks if a bitstream segment of a data stream that is currently selected by a sliding window matches one or more of known codewords of SCVs to generate one checking result. As shown in FIG. 2, the number of possible SCVs is 32, meaning that the number of known codewords (which act as known patterns used by pattern matching) is 32. In a worse case, all of the 32 known codewords are checked to determine a checking result for a 10-bit bit sequence included in a bitstream segment selected by a sliding window. To reduce computational complexity of pattern matching, the present invention further proposes using inherent characteristics of the known codewords of SCVs to avoid unnecessary pattern comparisons.

FIG. 5 is a diagram illustrating a first inherent characteristic possessed by known codewords of SCVs. In accordance with HDMI 2.0 specification, a 5-bit SCV consists of an IToggle bit and a 4-bit scrambled control code, and is encoded into a 10-bit codeword that is transmitted during a control period (e.g., scrambled control period). For any 5-bit SCV with IToggle=0, the 5-bit SCV has an even value. For any 5-bit SCV with IToggle=1, the 5-bit SCV has an odd value. As shown in FIG. 5, a most significant bit and a second most significant bit of a 10-bit codeword generated for an even valued SCV are both 0's, and a most significant bit and a second most significant bit of a 10-bit codeword generated for an odd valued SCV are 1's. In addition, within a data stream transmitted via a data channel of HDMI, a 10-bit codeword of an odd valued SCV is immediately followed by a 10-bit codeword of an even valued SCV, and a 10-bit codeword of an even valued SCV is immediately followed by a 10-bit codeword of an odd valued SCV. Based on such an observation, the pattern matching circuit 106 may check 4 bits, including a most significant bit and a second most significant bit of a first 10-bit bitstream portion of a bitstream segment selected by the sliding window 402 and a most significant bit and a second most significant bit of a second 10-bit bitstream portion of the bitstream segment selected by the sliding window 402, and determine if the most significant bit and the second most significant bit of the first 10-bit bitstream portion and the most significant bit and the second most significant bit of the second 10-bit bitstream portion have one of two predetermined bit combinations (e.g., "0011" and "1100").

When the most significant bit and the second most significant bit of the first 10-bit bitstream portion and the most significant bit and the second most significant bit of the second 10-bit bitstream portion have a predetermined bit combination (e.g., "0011" or "1100"), the pattern matching circuit 106 compares the first 10-bit bitstream portion with the known codewords (10-bit codewords of 5-bit SCVs) to determine if the first 10-bit bitstream portion matches one of the known codewords, compares the second 10-bit bitstream portion with the known codewords (10-bit codewords of 5-bit SCVs) to determine if the second 10-bit bitstream portion matches one of the known codewords, and generates a checking result.

When the most significant bit and the second most significant bit of the first 10-bit bitstream portion and the most significant bit and the second most significant bit of the second 10-bit bitstream portion do not have any of the predetermined bit combinations (e.g., "0011" and "1100"), the pattern matching circuit 106 skips pattern matching of the first 10-bit bitstream portion and pattern matching of the second 10-bit bitstream portion, and directly generates a checking result indicating that one or both of the first 10-bit bitstream portion and the second 10-bit bitstream portion do not match any of known codewords of SCVs. In this way, the proposed word boundary detection scheme can have low computational complexity.

FIG. 6 is a diagram illustrating a second inherent characteristic possessed by codewords of SCVs. For any even valued 5-bit SCV, the number of 1's included in a corresponding 10-bit codeword is equal to 4. For any odd valued 5-bit SCV, the number of 1's included in a corresponding 10-bit codeword is equal to 6. Based on such an observation, the pattern matching circuit 106 counts the number of 1's included in a bit sequence (which consists of 10 bits) in a bitstream segment selected by a sliding window, and determine if the number of 1's included in the bit sequence is equal to one of two predetermined values (e.g., 4 and 6). When the number of 1's included in the bit sequence is equal to a predetermined value (e.g., 4 or 6), the pattern matching circuit 106 compares the bit sequence with the known codewords (10-bit codewords of 5-bit SCVs) to determine if the bit sequence matches one of the known codewords. When the number of 1's included in the bit sequence is not equal to any of the two predetermined values (e.g., 4 and 6), the pattern matching circuit 106 skips pattern matching of the bit sequence, and directly judges that the bit sequence does not match any of the known codewords. In this way, the proposed word boundary detection scheme can have low computational complexity.

Considering a case where the sliding window 302 is employed by the pattern matching circuit 106, the bitstream segment selected by the sliding window 302 is one bit sequence consisting of 10 bits. When the number of 1's included in the bitstream segment is equal to a predetermined value (e.g., 4 or 6), the pattern matching circuit 106 compares the bitstream segment with the known codewords (10-bit codewords of 5-bit SCVs) to determine if the bitstream segment matches one of the known codewords. When the number of 1's included in the bitstream segment is not equal to any of the two predetermined values (e.g., 4 and 6), the pattern matching circuit 106 skips pattern matching of the bitstream segment, and directly generates a checking result indicating that the bitstream segment does not match any of the known codewords.

Considering another case where the sliding window 402 is employed by the pattern matching circuit 106, the bitstream segment selected by the sliding window 402 includes a first 10-bit bitstream portion (which is one bit sequence consisting of 10 bits) and a second 10-bit bitstream portion (which is a subsequent bit sequence consisting of 10 bits). When the number of 1's included in the first 10-bit bitstream portion is equal to one predetermined value (e.g., 4 or 6) and the number of 1's included in the second 10-bit bitstream portion is equal to another predetermined value (e.g., 6 or 4), the pattern matching circuit 106 compares the first 10-bit bitstream portion with the known codewords (10-bit codewords of 5-bit SCVs) to determine if the first 10-bit bitstream portion matches one of the known codewords, compares the second 10-bit bitstream portion with the known codewords (10-bit codewords of 5-bit SCVs) to determine if the second 10-bit bitstream portion matches one of the known codewords, and generates a checking result. When the number of 1's included in the first 10-bit bitstream portion is not equal to any of the two predetermined values (e.g., 4 and 6) and/or the number of 1's included in the second 10-bit bitstream portion is not equal to any of the two predetermined values (e.g., 4 and 6), the pattern matching circuit 106 skips pattern matching of the first 10-bit bitstream portion and pattern matching of the second 10-bit bitstream portion, and directly generates a checking result indicating that one or both of the first 10-bit bitstream portion and the second 10-bit bitstream portion do not match any of the known codewords.

FIG. 7 is a diagram illustrating a third inherent characteristic possessed by codewords of SCVs. For any 5-bit SCV having a value selected from a group {0, 1, 2, 3, 4, 5, 8, 9, 10, 11, 12, 13, 16, 17, 18, 19, 20, 21, 24, 25, 26, 27, 28, 29}, the number of bit transitions, each between 0 and 1, is equal to 3. For any 5-bit SCV having a value selected from a group {6, 7, 14, 15, 22, 23, 30, 31} is equal to 2. Based on such an observation, the pattern matching circuit 106 counts the number of bit transitions in a bit sequence (which consists of 10 bits) in a bitstream segment selected by a sliding window, and determine if the number of bit transitions in the bit sequence is equal to one of two predetermined values (e.g., 2 and 3). When the number of bit transitions in the bit sequence is equal to a predetermined value (e.g., 2 or 3), the pattern matching circuit 106 compares the bit sequence with the known codewords (10-bit codewords of 5-bit SCVs) to determine if the bit sequence matches one of the known codewords. When the number of bit transitions in the bit sequence is not equal to any of the two predetermined values (e.g., 2 and 3), the pattern matching circuit 106 skips pattern matching of the bit sequence, and directly judges that the bit sequence does not match any of the known codewords. In this way, the proposed word boundary detection scheme can have low computational complexity.

Considering a case where the sliding window 302 is employed by the pattern matching circuit 106, the bitstream segment selected by the sliding window 302 is one bit sequence consisting of 10 bits. When the number of bit transitions in the bitstream segment is equal to a predetermined value (e.g., 2 or 3), the pattern matching circuit 106 compares the bitstream segment with the known codewords (10-bit codewords of 5-bit SCVs) to determine if the bitstream segment matches one of the known codewords. When the number of bit transitions in the bitstream segment is not equal to any of the two predetermined values (e.g., 2 and 3), the pattern matching circuit 106 skips pattern matching of the bitstream segment, and directly generates a checking result indicating that the bitstream segment does not match any of the known codewords.

Considering another case where the sliding window 402 is employed by the pattern matching circuit 106, the bitstream segment selected by the sliding window 402 includes a first 10-bit bitstream portion (which is one bit sequence consisting of 10 bits) and a second 10-bit bitstream portion (which is a subsequent bit sequence consisting of 10 bits). When the number of bit transitions in the first 10-bit bitstream portion is equal to a predetermined value (e.g., 2 or 3) and the number of bit transitions in the second 10-bit bitstream portion is equal to a predetermined value (e.g., 2 or 3), the pattern matching circuit 106 compares the first 10-bit bitstream portion with the known codewords (10-bit codewords of SCVs) to determine if the first 10-bit bitstream portion matches one of the known codewords, compares the second 10-bit bitstream portion with the known codewords (10-bit codewords of 5-bit SCVs) to determine if the second 10-bit bitstream portion matches one of the known codewords, and generates a checking result. When the number of bit transitions in the first 10-bit bitstream portion is not equal to any of the two predetermined values (e.g., 2 and 3) and/or the number of bit transitions in the second 10-bit bitstream portion is not equal to any of the two predetermined values (e.g., 2 and 3), the pattern matching circuit 106 skips pattern matching of the first 10-bit bitstream portion and pattern matching of the second 10-bit bitstream portion, and directly generates a checking result indicating that one or both of the first 10-bit bitstream portion and the second 10-bit bitstream portion do not match any of the known codewords.

FIG. 8 is a diagram illustrating a fourth inherent characteristic possessed by codewords of SCVs. For any 5-bit SCV with IToggle=0, the 5-bit SCV has an even value, and a most significant bit of a corresponding 10-bit codeword has one binary value 0. For any 5-bit SCV with IToggle=1, the 5-bit SCV has an odd value, and a most significant bit of a corresponding 10-bit codeword has another binary value 1. Hence, the known codewords (10-bit codewords of 5-bit SCVs) can be categorized into a first group G1 and a second group G2, where a most significant bit of each known codeword included in the first group G1 has a first value (e.g., 0), and a most significant bit of each known codeword included in the second group G2 has a second value (e.g., 1). The pattern matching circuit 106 checks a most significant bit of a bit sequence (which consists of 10 bits) in a bitstream segment selected by a sliding window, refers to the most significant bit of the bit sequence to select a target group, and checks if the bit sequence matches one of known codewords in the target group, where when the most significant bit of the bit sequence has the first value (e.g., 0), the first group G1 is selected as the target group, and when the most significant bit of the bit sequence has the second value (e.g., 1), the second group G2 is selected as the target group. In this way, the proposed word boundary detection scheme can have low computational complexity.

Considering a case where the sliding window 302 is employed by the pattern matching circuit 106, the bitstream segment selected by the sliding window 302 is one bit sequence consisting of 10 bits. When the most significant bit of the bitstream segment has a binary value 0, the pattern matching circuit 106 compares the bitstream segment with 10-bit codewords of even valued SCVs to determine if the bitstream segment matches one known codeword, without comparing the bitstream segment with 10-bit codewords of odd valued SCVs. When the most significant bit of the bitstream segment has a binary value 1, the pattern matching circuit 106 compares the bitstream segment with 10-bit codewords of odd valued SCVs to determine if the bitstream segment matches one known codeword, without comparing the bitstream segment with 10-bit codewords of even valued SCVs.

Considering another case where the sliding window 402 is employed by the pattern matching circuit 106, the bitstream segment selected by the sliding window 402 includes a first 10-bit bitstream portion (which is one bit sequence consisting of 10 bits) and a second 10-bit bitstream portion (which is a subsequent bit sequence consisting of 10 bits). When the most significant bit of the first 10-bit bitstream portion has a binary value 0, the pattern matching circuit 106 compares the first 10-bit bitstream portion with 10-bit codewords of even valued SCVs to determine if the first 10-bit bitstream portion matches one known codeword, without comparing the first 10-bit bitstream portion with 10-bit codewords of odd valued SCVs. When the most significant bit of the first 10-bit bitstream portion has a binary value 1, the pattern matching circuit 106 compares the first 10-bit bitstream portion with 10-bit codewords of odd valued SCVs to determine if the first 10-bit bitstream portion matches one known codeword, without comparing the first 10-bit bitstream portion with 10-bit codewords of even valued SCVs.

When the most significant bit of the second 10-bit bitstream portion has a binary value 0, the pattern matching circuit 106 compares the second 10-bit bitstream portion with 10-bit codewords of even valued SCVs to determine if the second 10-bit bitstream portion matches one known codeword, without comparing the second 10-bit bitstream portion with 10-bit codewords of odd valued SCVs. When the most significant bit of the second 10-bit bitstream portion has a binary value 1, the pattern matching circuit 106 compares the second 10-bit bitstream portion with 10-bit codewords of odd valued SCVs to determine if the second 10-bit bitstream portion matches one known codeword, without comparing the second 10-bit bitstream portion with 10-bit codewords of even valued SCVs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A word boundary detection method comprising:
receiving a data stream from a data channel of a high definition multimedia interface (HDMI); and
performing pattern matching upon the data stream to identify a word boundary between two consecutive codewords transmitted via the data stream, wherein known codewords of scrambled control vectors are involved in said pattern matching, a size of a sliding window is an integer multiple of a size of one codeword, and performing pattern matching upon the data stream comprises:
moving a start point of the sliding window to each of a plurality of consecutive bits transmitted via the data stream;
in response to the start point of the sliding window at one of said plurality of consecutive bits, checking if a bitstream segment of the data stream that is selected by the sliding window matches one or more of the known codewords to generate one checking result, wherein a plurality of checking results are obtained by the sliding window for said plurality of consecutive bits, respectively, the size of one codeword is equal to N, N is a positive integer, a number of said plurality of consecutive bits is an integer multiple of N, and N scores are recorded for N word boundary shift values that are repeatedly checked by the sliding window employed by said pattern matching; and
identifying the word boundary between two consecutive codewords by referring to said plurality of checking results, comprising:
updating a score recorded for a word boundary shift value in response to a checking result indicating that a bitstream segment selected by the sliding window with the start point aligned with the word boundary shift value matches one or more of the known codewords; and
after a checking result is obtained in response to the start point of the sliding window at a last bit of said plurality of consecutive bits:
selecting a largest score from the N scores;
comparing the largest score with a predetermined threshold to generate a comparison result; and
in response to the comparison result that indicates the largest score reaches the predetermined threshold, identifying the word boundary between two consecutive codewords in the data stream according to a word boundary shift value that corresponds to the largest score.

2. The word boundary detection method of claim 1, wherein the integer multiple is equal to two; the bitstream segment comprises a first bitstream portion and a second bitstream portion, and each of the first bitstream portion and the second bitstream portion has a size equal to the size of one codeword; and checking if the bitstream segment of the data stream that is selected by the sliding window matches one or more of the known codewords comprises:
checking if a most significant bit and a second most significant bit of the first bitstream portion and a most significant bit and a second most significant bit of the second bitstream portion have a predetermined bit combination; and
in response to a condition that the most significant bit and the second most significant bit of the first bitstream portion and the most significant bit and the second most significant bit of the second bitstream portion have the predetermined bit combination, checking if the first bitstream portion matches one of the known codewords, and checking if the second bitstream portion matches one of the known codewords.

3. The word boundary detection method of claim 1, wherein the bitstream segment comprises a bit sequence having a size equal to the size of one codeword; and checking if the bitstream segment of the data stream that is selected by the sliding window matches one or more of the known codewords comprises:
checking if a number of 1's included in the bit sequence is equal to a predetermined value; and
in response to a condition that the number of 1's included in the bit sequence is equal to the predetermined value, checking if the bit sequence matches one of the known codewords.

4. The word boundary detection method of claim 1, wherein the bitstream segment comprises a bit sequence having a size equal to the size of one codeword; and checking if the bitstream segment of the data stream that is selected by the sliding window matches one or more of the known codewords comprises:
checking if a number of bit transitions in the bit sequence is equal to a predetermined value; and
in response to a condition that the number of bit transitions in the bit sequence is equal to the predetermined value, checking if the bit sequence matches one of the known codewords.

5. A word boundary detection method comprising:
receiving a data stream from a data channel of a high definition multimedia interface (HDMI); and
performing pattern matching upon the data stream to identify a word boundary between two consecutive codewords transmitted via the data stream, wherein known codewords of scrambled control vectors are involved in said pattern matching, a size of a sliding window employed by said pattern matching is an integer multiple of a size of one codeword; the known codewords are categorized into a first group and a second group, where a most significant bit of each known codeword included in the first group has a first value, and a most significant bit of each known codeword included in the second group has a second value; a bitstream segment of the data stream that is selected by the sliding window comprises a bit sequence having a size equal to the size of one codeword; and performing pattern matching upon the data stream comprises:
checking if the bitstream segment of the data stream that is selected by the sliding window matches one or more of the known codewords, comprising:
referring to a most significant bit of the bit sequence to select a target group, wherein the first group is selected as the target group in response to the most significant bit of the bit sequence having the first value, and the second group is selected as the target group in response to the most significant bit of the bit sequence having the second value; and
checking if the bit sequence matches one of known codewords in the target group.

6. The word boundary detection method of claim 1, wherein the integer multiple is equal to one.

7. The word boundary detection method of claim 1, wherein the integer multiple is larger than one.

8. The word boundary detection method of claim 7, wherein the integer multiple is equal to two.

9. A word boundary detection apparatus comprising:
a receiving circuit, arranged to receive a data stream from a data channel of a high definition multimedia interface (HDMI); and
a word boundary identifying circuit, arranged to perform pattern matching upon the data stream to identify a word boundary between two consecutive codewords transmitted via the data stream, wherein known codewords of scrambled control vectors are involved in said pattern matching performed by the word boundary identifying circuit, a size of a sliding window is an integer multiple of a size of one codeword, and the word boundary identifying circuit comprises:
a pattern matching circuit, arranged to move a start point of the sliding window to each of a plurality of consecutive bits transmitted via the data stream, and further arranged to check if a bitstream segment of the data stream that is selected by the sliding window matches one or more of the known codewords to generate one checking result when the start point of the sliding window is at one of said plurality of consecutive bits, wherein a plurality of checking results are obtained by the sliding window for said plurality of consecutive bits, respectively, the size of one codeword is equal to N, N is a positive integer, a number of said plurality of consecutive bits is an integer multiple of N, and N scores are recorded for N word boundary shift values that are repeatedly checked by the sliding window employed by the pattern matching circuit; and
a decision circuit, arranged to identify the word boundary between two consecutive codewords according to said plurality of checking results, wherein the decision circuit updates a score recorded for a word boundary shift value when a checking result indicates that a bitstream segment selected by the sliding window with the start point aligned with the word boundary shift value matches one or more of the known codewords, and after a checking result is obtained in response to the start point of the sliding window at a last bit of said plurality of consecutive bits, the decision circuit selects a largest score from the N scores, compares the largest score with a predetermined threshold to generate a comparison result, and identifies the word boundary between two consecutive codewords in the data stream according to a word boundary shift value that corresponds to the largest score when the comparison result indicates that the largest score reaches the predetermined threshold.

10. The word boundary detection apparatus of claim 9, wherein the integer multiple is equal to two; the bitstream segment comprises a first bitstream portion and a second bitstream portion, and each of the first bitstream portion and the second bitstream portion has a size equal to the size of one codeword; the pattern matching circuit checks if a most significant bit and a second most significant bit of the first bitstream portion and a most significant bit and a second most significant bit of the second bitstream portion have a predetermined bit combination; and when the most significant bit and the second most significant bit of the first bitstream portion and the most significant bit and the second most significant bit of the second bitstream portion have the predetermined bit combination, the pattern matching circuit checks if the first bitstream portion matches one of the known codewords, and checks if the second bitstream portion matches one of the known codewords.

11. The word boundary detection apparatus of claim 9, wherein the bitstream segment comprises a bit sequence having a size equal to the size of one codeword; the pattern matching circuit checks if a number of 1's included in the bit sequence is equal to a predetermined value; and when the number of 1's included in the bit sequence is equal to the predetermined value, the pattern matching circuit checks if the bit sequence matches one of the known codewords.

12. The word boundary detection apparatus of claim 9, wherein the bitstream segment comprises a bit sequence having a size equal to the size of one codeword; the pattern matching circuit checks if a number of bit transitions in the bit sequence is equal to a predetermined value; and when the number of bit transitions in the bit sequence is equal to the predetermined value, the pattern matching circuit checks if the bit sequence matches one of the known codewords.

13. A word boundary detection apparatus comprising:
a receiving circuit, arranged to receive a data stream from a data channel of a high definition multimedia interface (HDMI); and
a word boundary identifying circuit, arranged to perform pattern matching upon the data stream to identify a word boundary between two consecutive codewords transmitted via the data stream, wherein known codewords of scrambled control vectors are involved in said pattern matching performed by the word boundary identifying circuit, a size of a sliding window employed by said pattern matching is an integer multiple of a size of one codeword, the known codewords are categorized into a first group and a second group, where a most significant bit of each known codeword included in the first group has a first value, and a most significant bit of each known codeword included in the second group has a second value; a bitstream segment of the data stream that is selected by the sliding window comprises a bit sequence having a size equal to the size of one codeword; and the word boundary identifying circuit comprises a pattern matching circuit that refers to a most significant bit of the bit sequence to select a target group, and checks if the bit sequence matches one of known codewords in the target group, where when the most significant bit of the bit sequence has the first value, the first group is selected as the target group, and when the most significant bit of the bit sequence has the second value, the second group is selected as the target group.

14. The word boundary detection apparatus of claim 9, wherein the integer multiple is equal to one.

15. The word boundary detection apparatus of claim 9, wherein the integer multiple is larger than one.

16. The word boundary detection apparatus of claim 15, wherein the integer multiple is equal to two.

\* \* \* \* \*